United States Patent
Shi et al.

(10) Patent No.: US 7,353,031 B2
(45) Date of Patent: Apr. 1, 2008

(54) METHOD FOR ESTIMATING THE LOCATION OF A WIRELESS DEVICE IN A COMMUNICATION NETWORK

(75) Inventors: Qicai Shi, Coral Springs, FL (US); Neiyer S. Correal, Cooper City, FL (US); Jian Huang, Coral Springs, FL (US); Spyros Kyperountas, Weston, FL (US)

(73) Assignee: Motorola, Inc., Schaumburg, IL (US)

( * ) Notice: Subject to any disclaimer, the term of this patent is extended or adjusted under 35 U.S.C. 154(b) by 463 days.

(21) Appl. No.: 11/147,869

(22) Filed: Jun. 8, 2005

(65) Prior Publication Data

US 2006/0281470 A1   Dec. 14, 2006

(51) Int. Cl.
*H04Q 7/20* (2006.01)
(52) U.S. Cl. .............................. 455/456.1; 455/404.2; 455/440; 455/443; 455/444
(58) Field of Classification Search ............. 455/404.2, 455/456.1, 440, 443, 444
See application file for complete search history.

(56) References Cited

U.S. PATENT DOCUMENTS

2004/0008138 A1* 1/2004 Hockley et al. ....... 342/357.09

2005/0228613 A1* 10/2005 Fullerton et al. ........... 702/150

OTHER PUBLICATIONS

GPS-Less Low-Cost Outdoor Localization for Very Small Devices—Nirupama Bulusu, et al—University of Southern California/Information Sciences Institute—Oct. 2000 IEEE Personal Communication—pp. 28-54.
Ad Hoc Positioning System (APS)—Dragos Niculescu et al—Computer Science Dept, Rutgers University—2001 IEEE—pp. 2926-2931.
Range-Free Localization Schemes for Large Scale Sensor Networks—Tian He et al—Dept. of Computer Sciences, University of Virginia—pp. 81-95.

* cited by examiner

*Primary Examiner*—Duc M. Nguyen
*Assistant Examiner*—Wayne Cai
(74) *Attorney, Agent, or Firm*—Barbara R. Doutre (57) ABSTRACT

A method for estimating the location of a blindfolded node (235) in a wireless network having reference nodes (225, 230) is provided. The reference nodes (225, 230) are combined into pairs (301) and each pair is checked to determine if the reference nodes are within each other's communication rage (304). A plurality of probable regions (315) for the blindfolded node are obtained (313, 315). These probable regions are overlapped (320), and the blindfolded node's estimated location is estimated to be the geometric center of the overlapped regions (325).

13 Claims, 5 Drawing Sheets

METHOD FOR ESTIMATING THE LOCATION OF A WIRELESS DEVICE IN A COMMUNICATION NETWORK

FIELD OF INVENTION

The present invention relates to location estimation techniques in general and range free location estimation techniques in particular.

BACKGROUND OF THE INVENTION

In many wireless sensor networks techniques a cost effective location discovery technique is desirable. One such application includes a warehouse, where it is desirable to track the location of a large number of items efficiently. Many location estimation techniques for sensor networks are available in the art. These techniques can generally be divided into range based techniques and range free techniques. Range based location estimation techniques generally require an ability to make accurate pair-wise ranging measurements requiring costly infrastructure and hardware. Range free location estimation techniques, on the other hand, are generally considered cost effective.

One range-free location estimation technique known in the art utilizes proximity-based coarse location determination. This proximity technique estimates node location (transceiver location) by averaging the locations of anchor nodes or reference nodes (nodes with a priori location awareness such as devices placed at known positions on a map) within a communication range. Another range-free location technique, used for ad-hoc networks, counts the number of hops from node to every anchor to acquire coarse range estimation. Once the node has three or more range estimates, triangulation (multilateration) is used to estimate the node location. However, these known techniques provide very limited location estimation accuracy.

Another range free location estimation technique proposed in the art uses anchor nodes to form many triangular regions. A node is determined either inside or outside a triangular region. By combining these triangular regions, a node can be located by narrowing down the area where it can potentially reside. This technique has several shortcomings in that it requires a very complicated decision process, especially for 3-D location systems where a node's location estimation is highly dependent upon the distribution of its neighbor node. The triangulation technique is also inefficient for an irregularly deployed network.

Hence, there is a need for an improved range free location estimation method.

BRIEF DESCRIPTION OF THE DIAGRAMS

The accompanying figures together with the detailed description below are incorporated in and form part of the specification, serve to further illustrate various embodiments and to explain various principles and advantages all in accordance with the present invention.

DETAILED DESCRIPTION

The present invention may be embodied in several forms and manners. The description provided below and the drawings show exemplary embodiments of the invention. Those of skill in the art will appreciate that the invention may be embodied in other forms and manners not shown below. The invention shall have the full scope of the claims and shall not be limited by the embodiments shown below. It is further understood that the use of relational terms, if any, such as first, second, top and bottom, front and rear and the like are used solely for distinguishing one entity or action from another, without necessarily requiring or implying any such actual relationship or order between such entities or actions.

For the purposes of this application, during network initialization nodes (transceivers) are classified as either reference nodes (nodes with a priori location awareness such as devices placed at known positions on a map) or blindfolded, nodes having no initial positional awareness. At least one of the initially deployed nodes (reference or blindfolded) with sufficient memory and processing capability will act as a central processing center (e.g., gateway device or data sink) to process discrete location data from each network node, perform location calculations, and translate node location estimates to positions on a network map. The central processing node(s) and the other reference nodes piece together the overall network map. The information needed for location estimation is acquired from each node via peer-to-peer communication exchanges with there neighbors. This information is then forwarded to the central processing node. A node's receiver can detect signals of strength above a certain threshold (receiver sensitivity), which defines the average maximum communication range for given environments.

Briefly, in accordance with the present invention, there is provided herein a range free location technique that gives better location estimation accuracy than range free location techniques known in the art. Embodiments disclosed in the invention, make use of monotonic functions, such as received signal strength (RSS) or time of arrival (TOA), to determine the location of blindfolded nodes. Monotonic functions are generally defined to be functions that decrease or increase but do not reverse in direction. As per one embodiment of the invention, the location of a blindfolded node is determined based on the received signal strength of the blindfolded node at a reference node. The present invention makes an assumption that the RSS measurement is a monotonic function of the range between any two nodes within each other's communication range. However, those skilled in the art shall appreciate that other parameters having a monotonic relationship with the distance between any two nodes within the communication range can also be used.

Pursuant to an embodiment of the invention, the location of the blindfolded node is estimated based on the received signal strength values together with the locations of the reference nodes. With each iteration, the probable location is reduced. Finally, computing the geometric center of the probable location yields the estimated location of the blindfolded node. Further enhancement can be achieved when a blindfolded node that has already been located using the techniques disclosed in the present invention, serves as reference node to determine the position of other blindfolded nodes within its communication range.

Figure 1:
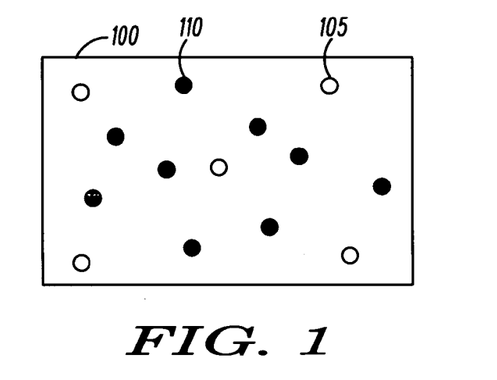
FIG. 1 is a diagram representing a wireless network in accordance with the present invention.

Turning now to FIG. 1, a diagram representing a wireless network in accordance with embodiments of the present invention is shown and generally indicated at 100. Network 100 is a network of blindfolded nodes 110 and reference nodes 105. FIG. 1 illustrates a general network where blindfolded nodes 110 may form a larger percentage of the network as compared to the reference nodes 105. Every node within a communication range of another node communicates with the other nodes in the network and collects received signal strength (RSS) information. The locations of the blindfolded nodes 110 are then estimated based on the received signal strength measurements and the location information of the reference nodes 105. A reference node 105 is a node whose location is known. While placing the nodes within the network, a user is aware of the location of the reference nodes 105 and hence these nodes serve as references for estimating the location of blindfolded nodes 110 within the network 100. In addition to RSS values, several parameters, such as infrared (IR) strength, magnetic strength, and time of arrival (TOA), can be used to estimate the general location of the blindfolded nodes.

Figure 2A:
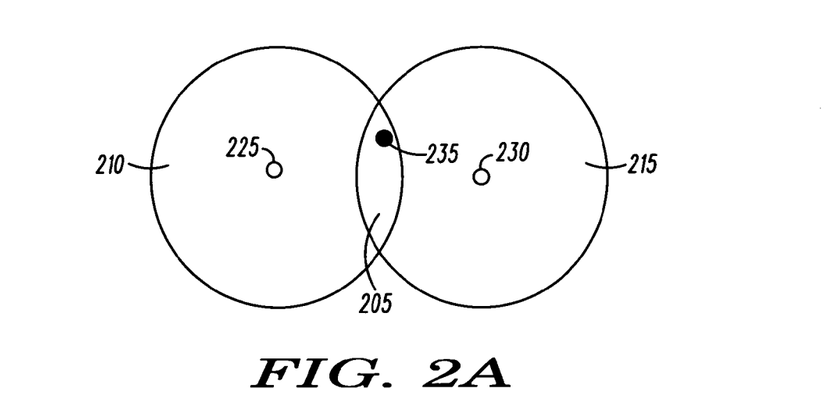
FIG. 2(a) and FIG. 2(b) are diagrams representing location estimation of a blindfolded node in a wireless communications network pursuant to a first embodiment of the invention.
Figure 2B:
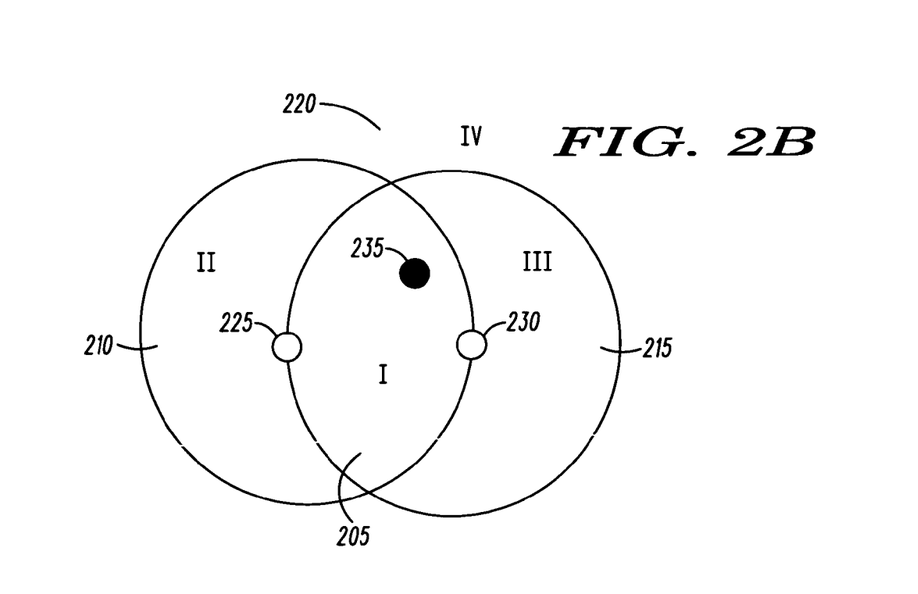
Figure 3:
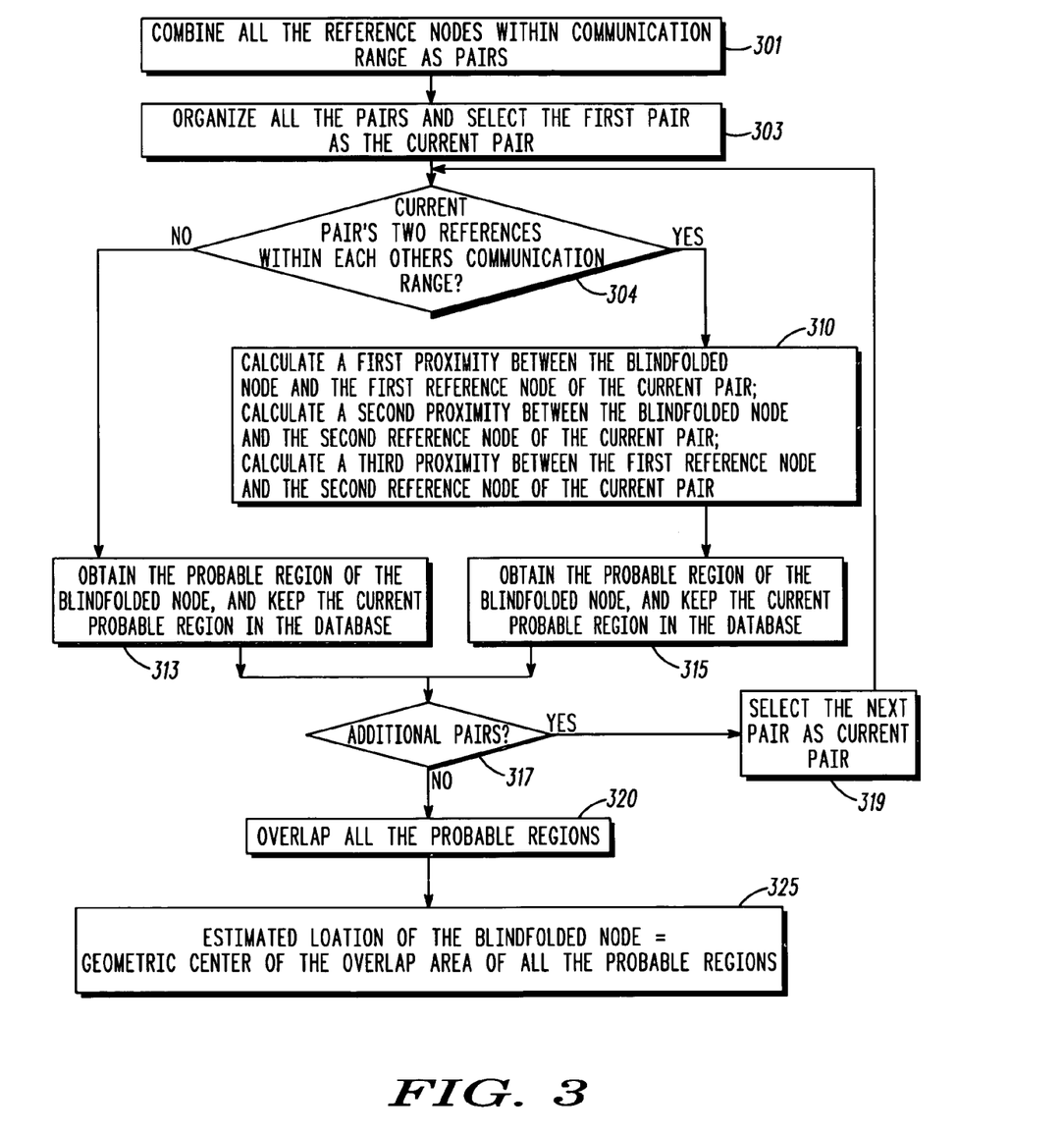
FIG. 3 is a flowchart for estimating the location of a blindfolded node in a wireless communications network pursuant to the first embodiment of the invention.

Turning now to FIG. 2 and FIG. 3, network diagram and a flowchart depicting a first embodiment for estimating the location of a blindfolded node are shown. The first embodiment provides a technique used to estimate the location of a blindfolded node having two or more reference nodes within the communication range of the blindfolded node. Pursuant to the first embodiment, all the reference nodes within the communication range of the blindfolded node are combined as pairs where each reference node is paired with another reference node within communication range of the blindfolded node, step 301. For example in the case of three reference nodes 'A', 'B' and 'C', the reference nodes can be paired as 'AB', 'BC' and 'AC'.

Then, all the reference pairs are organized, and one pair is selected as a current pair, step 303. For the current pair of reference nodes 225, 230, there are two possible scenarios. In the first scenario, the two reference nodes 225, 230 are not within each others communication range. In the second scenario, the first reference node 225 and the second reference node 230 are within communication range of each other. Step 304 determines whether the two reference nodes of the current pair are within communication range or not.

In the first scenario as shown in FIG. 2A, the first reference node 225 and the second reference node 230 are not within communication range of each other. In this case, a common region between a first circular region 210 centered at the first reference node 225 with a radius substantially equal to a maximum communication range of the first reference node 225 and a second circular region 215 centered at the second reference node 230 with a radius substantially equal to a maximum communication range of the second reference node 230 is determined. The common region 205 is determined as an overlapping area of the first and second circular regions 210 and 215. This common region 205 is the probable region of the blindfolded node 235, obtained at step 313. The maximum communication range for each node is generally predetermined for a system and is usually determined by the transmit power of the reference nodes. Those skilled in the art shall appreciate that circular regions serve to provide a clearer picture of the regions enclosed within the maximum communication range of the reference nodes. However, geometric regions can be depicted as a closed contour curves that define the coverage pattern for a given value of the parameter being measured. In the absence of contour information the closed curves are circles, however when there is a-priori information these contour regions can be obtained based on other parameters that may alter the representation of such regions and all such representations are within the scope of the present invention.

In the second scenario as shown in FIG. 2B, the first reference node 225 and the second reference node 230 are within the communication range of each other. In this case, a first proximity is calculated between the first reference node 225 and the blindfolded node 235; a second proximity is calculated between the blindfolded node 235 and the second reference node 230; and a third proximity is calculated between the first reference node 225 and the second reference node 230, step 310.

The proximity calculations of step 310 are determined, in one embodiment, based on the received signal strength. The reference nodes 225, 230 and the blindfolded node 235 divide the network into four regions (regions I, II, III and IV), as seen in FIG. 2B. A first region (region I) is a common region 205 between a first circular region 210 and a second circular region 215. The first circular region 210 is a region centered at the first reference node 225 with a radius substantially equal to the distance between the first reference node 225 and the second reference node 230. The second circular region 215 is a region centered at the second reference node 230 with a radius substantially equal to the distance between the first reference node 225 and the second reference node 230. The first circular region 210 excluding the first region 205, represents a second region (region II). The second circular region 215 excluding the first region 205 represents a third region (region III). A fourth region 220 (region IV) is a region outside the first, second and third regions. Those skilled in the art shall appreciate that proximity is determined based on the received signal strength and hence, the received signal strength can also be used to determine a probable region of the blindfolded nodes, and all such embodiments based on different parameters are within the scope of the present invention. Those skilled in the art shall also appreciate that circular regions serve to provide a clearer picture of the regions. However, geometric regions can be depicted as closed contour curves that define the coverage pattern for a given value of the parameter being measured. In the absence of contour information, the closed curves are circles, however when there is a-priori information these contour regions can be obtained based on other parameters that may alter the representation of such regions and all such representations are within the scope of the present invention.

The probable region of the blindfolded node 235 is obtained, step 315, based on performing a comparison between the first proximity with the third proximity and the second proximity with the third proximity for each pair of reference nodes. The probable region of the blindfolded node 235 is determined to be in the first region (region I), or the overlapping region, where the first proximity is greater than the third proximity and the second proximity is greater than the third proximity. The probable region of the blindfolded node is determined to be in the second region (region II) where the first proximity is greater than the third proximity and the second proximity is less than the third proximity. However, where the first proximity is less than the third proximity and the second proximity is greater than the third proximity, the probable region of the blindfolded node is determined to be in the third region (region III). In the event where the first proximity is less than the third proximity and the second proximity is less than the third proximity, the probable region of the blindfolded node is determined to be in the fourth region (region IV) 220, that is a region outside the first, second and third regions.

The above described methods for both FIG. 2 and FIG. 3 are repeated for each additional pair of references, steps 317, 319, to yield a plurality of probable regions. By overlapping all the probable regions, a final probable region of the blindfolded node 235 is identified, step 320. The estimated location of the blindfolded node 235 is the geometric center of the overlap area of all the probable regions, step 325.

The overlapping step performed at step 320 is preferably accomplished by the following process. First, the probable region determined by the first pair of references is picked, then the second probable region is overlapped with the first region to form the current common area, in a case where there is no overlapping area, the second probable region will be expanded until there is an overlapping area; then the third probable region is overlapped with the current common region to form a new current common region, in a case where there is no overlapping area, the third probable region will be expanded until there is an overlapping area. The processes are repeated until all the probable regions are processed. This expansion is done on the basis that received signal strength may not actually be equal to the free space signal strength because of fading, shadowing or measurement errors. To compensate for errors, the circular region is expanded until an overlapping area is obtained.

Figure 4A:
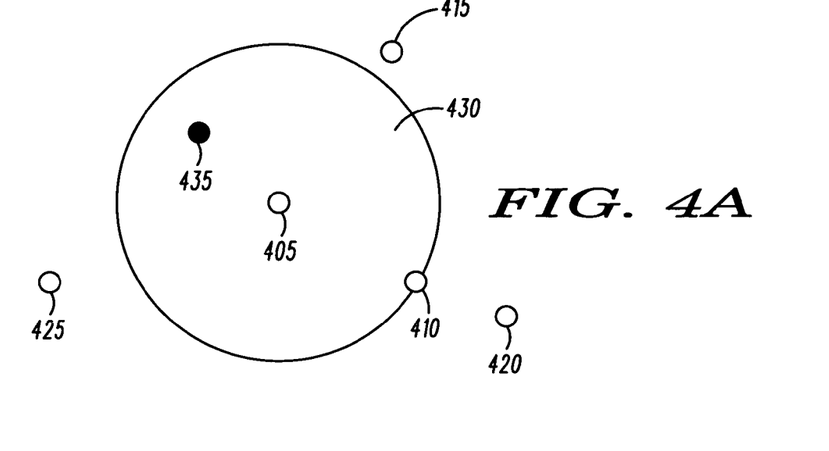
FIG. 4(a), FIG. 4(b) and FIG. 4(c) are diagrams representing location estimation of a blindfolded node in a wireless communications network pursuant to a second embodiment of the invention.
Figure 4B:
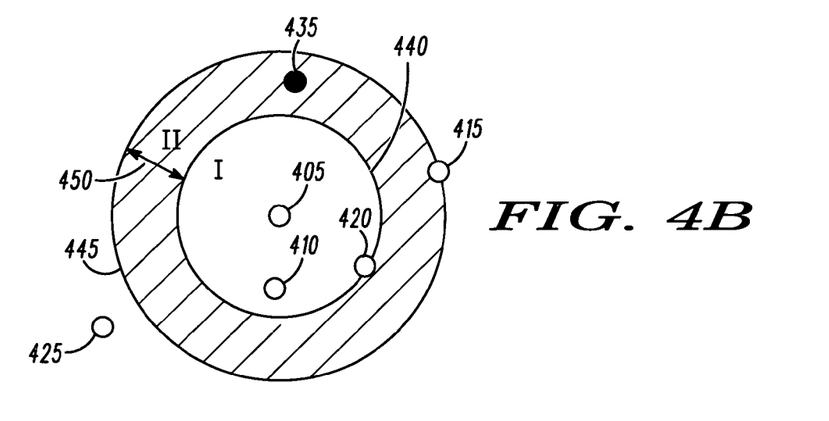
Figure 4C:
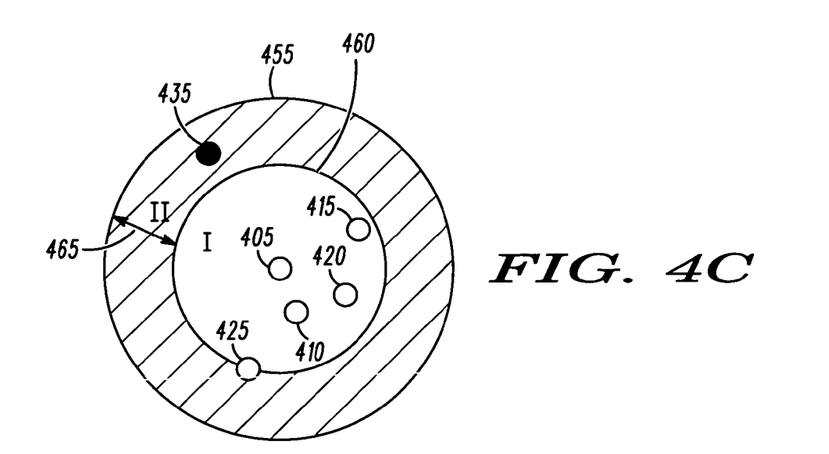
Figure 5:
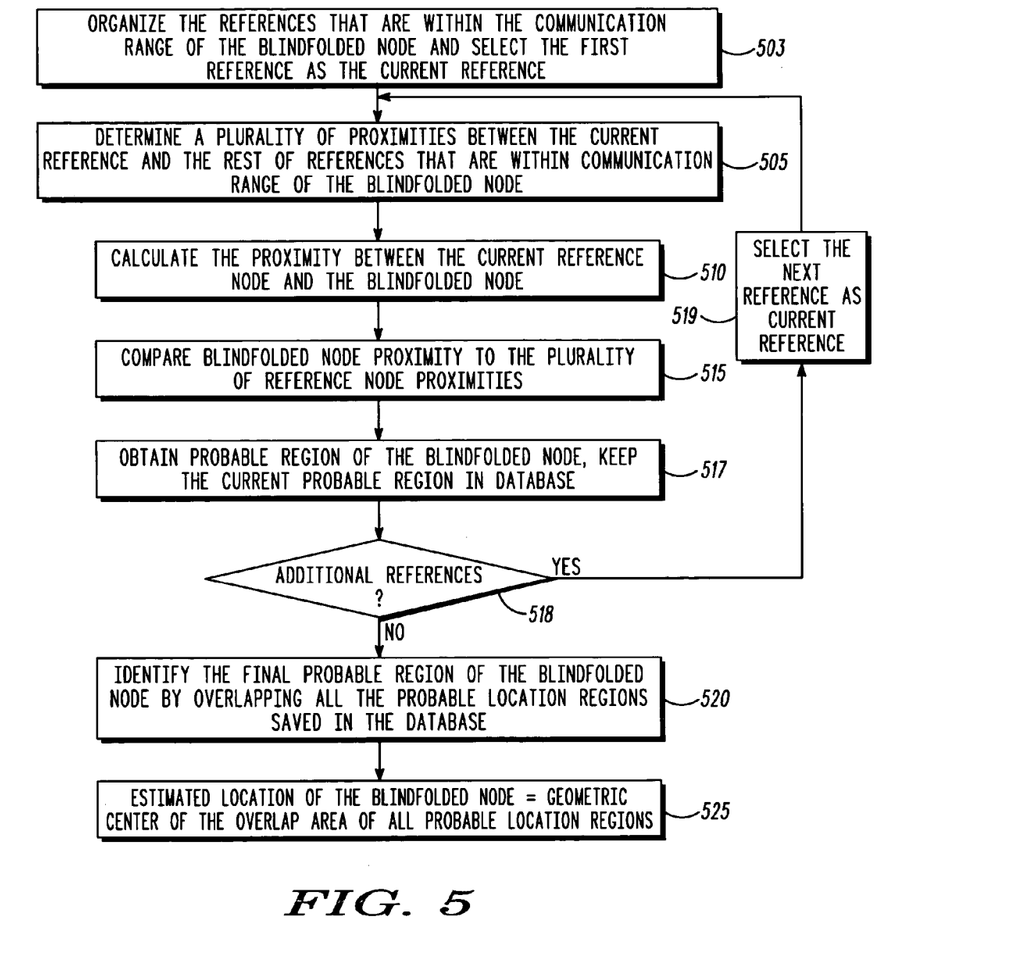
FIG. 5 is a flowchart for estimating the location of a blindfolded node in a wireless communications network pursuant to the second embodiment of the invention.

Turning now to FIG. 4(*a*), (*b*) and(*c*) and FIG. 5, wireless network diagrams and a flowchart depicting a second embodiment for estimating the location of a blindfolded node are shown. The second embodiment discloses a technique used to estimate the location of the blindfolded node having at least two reference nodes within its communication range. Firstly, all the reference nodes within the communication range of the blindfolded node are organized, and one of these reference nodes is selected as a current reference, step 503. Then a plurality of reference node proximities between the current reference node and the rest of references nodes in the plurality of reference nodes within the communication range of the blindfolded node are calculated based on a predetermined parameter, step 505. The predetermined parameter can be one of received signal strength, IR strength, a magnetic strength and a TOA. In step 510, the blindfolded node proximity between the blindfolded node and the current reference node is calculated. The blindfolded node proximity is compared with the plurality of reference node proximities, step 515. A probable region of the blindfolded node is obtained based on the comparison results, step 517.

Elaborating on the step 517, in one embodiment, a matrix corresponding to the plurality of reference proximities is created. The creation of the matrix serves to represent an example to order the values determined. Those skilled in the art shall appreciate that other ways of storing such values for comparison can also be used and such ways are within the scope of the present invention. In an exemplary embodiment, the matrix is sorted to enhance performance in an ascending or descending order. The proximity between the current reference node 405 and the blindfolded node 435 is compared with each value in the matrix corresponding to the proximity between the current reference node 405 and each of the other reference nodes within the communication range of the blindfolded node 435.

While performing the comparison at step 515, there are three possible cases that can be encountered. CASE 1; FIG. 4A: In this case, the proximity between the blindfolded node 435 and the current reference node 405 is greater than the maximum value in the matrix. The probable region of the blindfolded node is determined to be a circular region 430 centered at the current reference node 405 and having a radius substantially equal to a distance between the current reference node 405 and a maximum value reference node 410.

CASE 2; FIG. 4B: In this case, the probable region of the blindfolded node 435 is determined to be a ring region when the proximity between the blindfolded node 435 and the current reference node 405 falls between a first value and a second value of the matrix corresponding to the plurality of reference node proximities. The ring region 450 (region II) is a region between a first circular region 440 (region I) and a second circular region 445. The first circular region 440 is a region created with a center at the current reference node 405 and having a radius substantially equal to a distance between the current reference node 405 and the reference node 420 corresponding to the first value. The second circular region 445 in this case is centered at the current reference node 405 and having a radius substantially equal to a distance between the current reference node 405 and the reference node 415 corresponding to the second value.

CASE 3; FIG. 4C: In this case, the probable region of the blindfolded node 435 is determined to be a ring region 465 when the blindfolded node proximity is less than the minimum value of the plurality of proximities. The ring region 465 (region II) is a region between a first circular region 460 (region I) and a second circular region 455. The first circular region 460 is centered at the current reference node 405 and has a radius substantially equal to a distance between the current reference node 405 and a minimum value reference node 425. The second circular region 455 in this case is centered at the current reference node 405 and has a radius substantially equal to a maximum communication range of the current reference node 405. The minimum value reference node corresponds to the reference node with minimum proximity value as shown in FIG. 4(*c*)

The above described location estimation technique for both FIG. 4 and FIG. 5 are repeated for each additional reference node within the communication range of the blindfolded node 435, step 518 and step 519 to yield a plurality of probable regions. The overlap area of all the probable regions is the final probable region of the blindfolded node 235, step 520. The estimated location of the blindfolded node 435 is the geometric center of the overlap area of all the probable locations, step 525.

Elaborating on the step 520, first, the probable region determined by the first references is picked, then the second probable region is overlapped with the first region to form the current common area. In a case where there is no overlapping area, the second probable region will be expanded until there is an overlapping area; then the third probable region is overlapped with the current common region to form a new current common region. In a case where there is no overlapping area, the third probable region will be expanded until there is an overlapping area. The processes repeated until all the probable regions are processed. This expansion is done on the basis that received signal strength may not actually be equal to the free space signal strength because of fading, shadowing or measurement errors. To compensate for errors, the circular region is expanded until an overlapping area is obtained.

Figure 6:
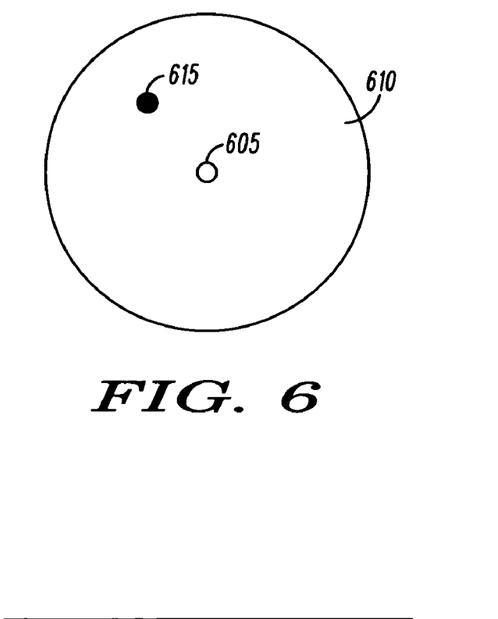
FIG. 6 is a diagram representing location estimation of a blindfolded node in a wireless communication network pursuant to a third embodiment of the invention.

Turning now to FIG. 6, a wireless network diagram is shown and a third embodiment for estimating the location of a blindfolded node is provided. The third embodiment provides a method where the location of the blindfolded node is determined when there is only one reference node within the communication range of the blindfolded node. As shown in FIG. 6, a circular region 610 is determined wherein the center of the circular region 610 is the first reference node 605 and the radius of the circular region 610 is the maximum communication range of the reference node 605. The probable. location of the blindfolded node 615 is determined to be the circular region 610.

In a fourth embodiment of the present invention, a method is provided to estimate the location of a blindfolded node in a case where there are no reference nodes within its communication range. In this fourth embodiment, the probable location of the blindfolded node is the complementary region of the coverage areas of all the reference nodes. Hence, the coverage areas of all the reference nodes in the network are obtained and the complementary region to that is the probable location of the blindfolded node.

Figure 7:
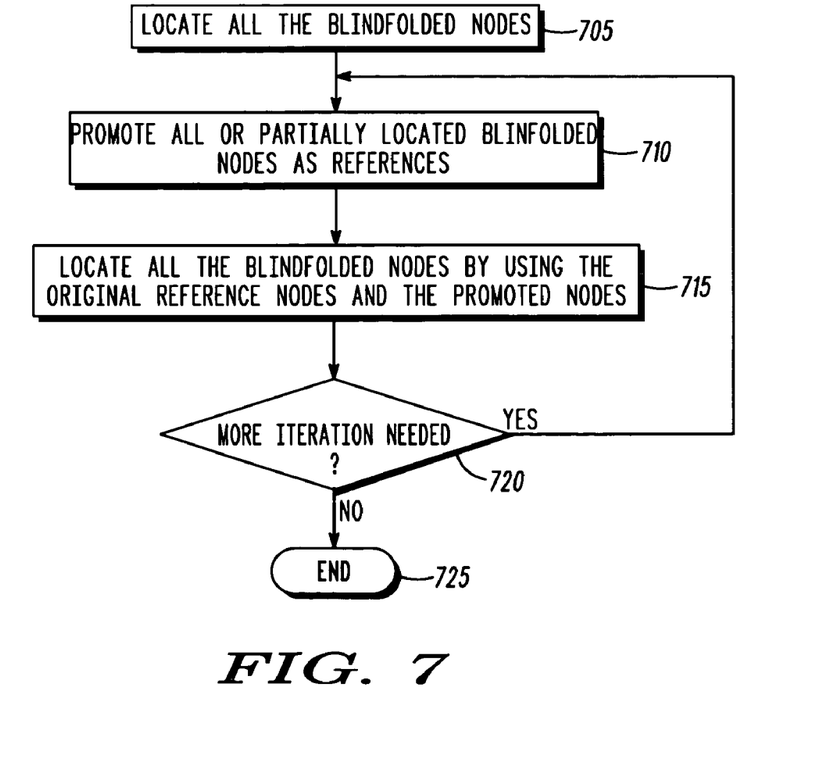
FIG. 7 is a flowchart for estimating the location of a blindfolded node in a wireless communications network pursuant another embodiment of the invention.

Turning now to FIG. 7, a flowchart depicting another embodiment for estimating the location of a blindfolded node is shown. In step 705, all the blindfolded nodes are located utilizing the reference nodes in conjunction with any of the techniques described in the previous embodiments. All or partially located blindfolded nodes are then promoted as reference nodes, step 710. At step 715, all the blindfolded nodes are located again by using all the promoted reference nodes and the original reference nodes in conjunction with the techniques described in the previous embodiments. In the next step, step 720, a decision is made to see whether these procedures should be repeated. In one embodiment, this decision is made based on the difference values of any two successive estimated values. Those skilled in the art shall appreciate that other ways of deciding can also be used and such ways are within the scope of the present invention. If further iteration is needed, then steps 710 and 715 are repeated. If another iteration is not needed, then the locating procedure is ended at step 725.

Accordingly, there has been provided a range free location estimation method that utilizes a simple technique that can be applied to regularly and irregularly deployed networks. The range fee location estimation technique can be run via a controller/microprocessor within the wireless network without the addition of costly infrastructure or hardware. Since more than one bit of quantized RSS information is used in the location estimation technique, better location accuracy is provided than with the proximity-based techniques. By combining the reference nodes into pairs instead of triangular regions, issues with incorrect decisions associated with the prior art are overcome. The location estimation technique of the present invention does not use neighbor blindfolded nodes for region decisions, making it a more stable and reliable technique than ad hoc positioning techniques currently used in the art.

What is claimed is:

1. A method of estimating a location of a blindfolded node in a wireless network having a plurality of reference nodes, the method comprising:
   combining the plurality of reference nodes into reference pairs;
   obtaining a plurality of probable regions for the blindfolded node based on the reference pairs;
   overlapping the plurality of probable regions;
   estimating the location of the blindfolded node as a geometric center of the overlapped plurality of probable regions; and
   wherein the step of obtaining a plurality of probable regions for the blindfolded node based on the reference pairs, includes the steps of:
   determining whether each reference pair's reference nodes are not within communication range of each other; and
   for each reference pair's reference nodes that are not within communication range of each other, determining a common region between a first geometric region and a second geometric region, the first geometric region being determined by a geometric location of a first reference node and a maximum communication range of the first reference node, and the second geometric region being determined by a geometric location of the second reference node and a maximum communication range of the second reference node, the probable location of the blindfolded node being within the common region.

2. The methods of claim 1 wherein the geometric region is a circular region.

3. The method of claim 1, wherein the step of obtaining a plurality of probable regions for the blindfolded node based on the reference pairs, includes the steps of:
   determining whether first and second reference nodes of the reference pair are within each other's communication range; and
   when the first and second reference nodes are within each other's communication range, calculating proximity information between the blindfolded node and the first and second reference nodes to obtain first, second and third proximities; and
   comparing the first proximity with the third proximity and the second proximity with the third proximity for each pair of reference nodes to obtain the plurality of probable regions.

4. The method of claim 3, wherein the step of calculating comprises:
   calculating the first proximity between the blindfolded node and the first reference node based on a predetermined parameter;
   calculating the second proximity between the blindfolded node and the second reference node based on the predetermined parameter; and
   calculating a third proximity between the first reference node and the second reference node based on the predetermined parameter, the first reference node and the second reference node being within a communication range of each other.

5. The method of claim 4, wherein the predetermined parameter comprises at least one of received signal strength indicator, a magnetic strength indicator, an infrared strength indicator and a time of arrival indicator.

6. The method of claim 1, further comprising determining the location of another blindfolded node by using the estimated location of a current blindfolded node as a reference node in conjunction with the plurality of reference nodes.

7. The method of claim 1, wherein the step of overlapping further includes the step of expanding a probable region when there no overlapping area so as to create an overlapping area.

8. A method of estimating a location of a blindfolded node in a wireless network having a plurality of reference nodes, the method comprising:

combining the plurality of reference nodes into reference pairs;

obtaining a plurality of probable regions for the blindfolded node based on the reference pairs;

overlapping the plurality of probable regions, wherein the step of overlapping further includes the step of expanding a probable region when there no overlapping area so as to create an overlapping area; and     estimating the location of the blindfolded node as a geometric center of the overlapped plurality of probable regions.

9. The method of claim 8, wherein the geometric region is a circular region.

10. The method of claim 8, wherein the step of obtaining a plurality of probable regions for the blindfolded node based on the reference pairs, includes the steps of:

determining whether first and second reference nodes of the reference pair are within each other's communication range; and     when the first and second reference nodes are within each other's communication range, calculating proximity information between the blindfolded node and the first and second reference nodes to obtain first, second and third proximities; and     comparing the first proximity with the third proximity and the second proximity with the third proximity for each pair of reference nodes to obtain the plurality of probable regions.

11. The method of claim 10, wherein the step of calculating comprises:

calculating the first proximity between the blindfolded node and the first reference node based on a predetermined parameter;

calculating the second proximity between the blindfolded node and the second reference node based on the predetermined parameter; and     calculating a third proximity between the first reference node and the second reference node based on the predetermined parameter, the first reference node and the second reference node being within a communication range of each other.

12. The method of claim 11, wherein the predetermined parameter comprises at least one of received signal strength indicator, a magnetic strength indicator, an infrared strength indicator and a time of arrival indicator.

13. The method of claim 8, further comprising determining the location of another blindfolded node by using the estimated location of a current blindfolded node as a reference node in conjunction with the plurality of reference nodes.

\* \* \* \* \*